United States Patent [19]

Stevens, Jr.

[11] 3,983,607
[45] Oct. 5, 1976

[54] SAFETY HOOK
[75] Inventor: Howard C. Stevens, Jr., Muskegon, Mich.
[73] Assignee: Dresser Industries, Inc., Dallas, Tex.
[22] Filed: Jan. 14, 1976
[21] Appl. No.: 648,837

[52] U.S. Cl. .......................... 24/241 PS; 294/82 R; 24/232 R
[51] Int. Cl.² ........................................ A44B 13/02
[58] Field of Search .................. 24/241 PS, 241 SP; 294/82

[56] References Cited
UNITED STATES PATENTS
3,126,604  3/1964  Smith .............................. 294/82 R
FOREIGN PATENTS OR APPLICATIONS
1,014,455  8/1952  France ............................ 294/82 R Primary Examiner—Bernard A. Gelak
Attorney, Agent, or Firm—R. L. Van Winkle; J. N. Hazelwood

[57] ABSTRACT

The safety hook disclosed herein includes a hook body that is comprised of a general cylindrical shank and a curved bill that defines a hook throat and terminates in a bill tip. An L-shaped latch member is arranged to close the hook opening and to be latched into closed position due to its engagement with the hook body and with the bill tip. Opening of the hook to receive the load requires linear and rotational movement of the latch member. Such movement is easily accomplished intentionally, but virtually impossible to accomplish inadvertently. Further, the latching mechanism may include apparatus for retaining the latch member in an open position when desired and also may include spring return means for returning the latch member to the closed position automatically.

11 Claims, 8 Drawing Figures

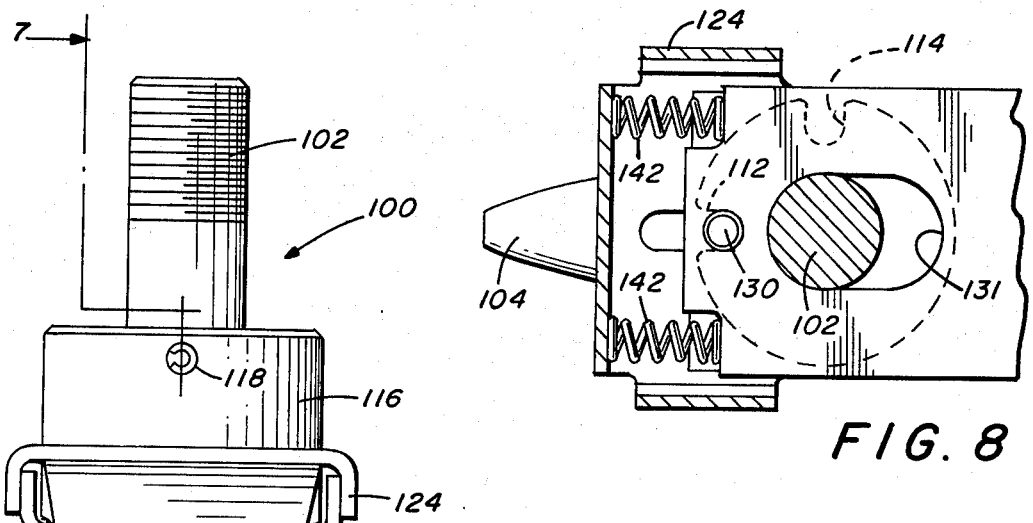
FIG. 6
FIG. 8
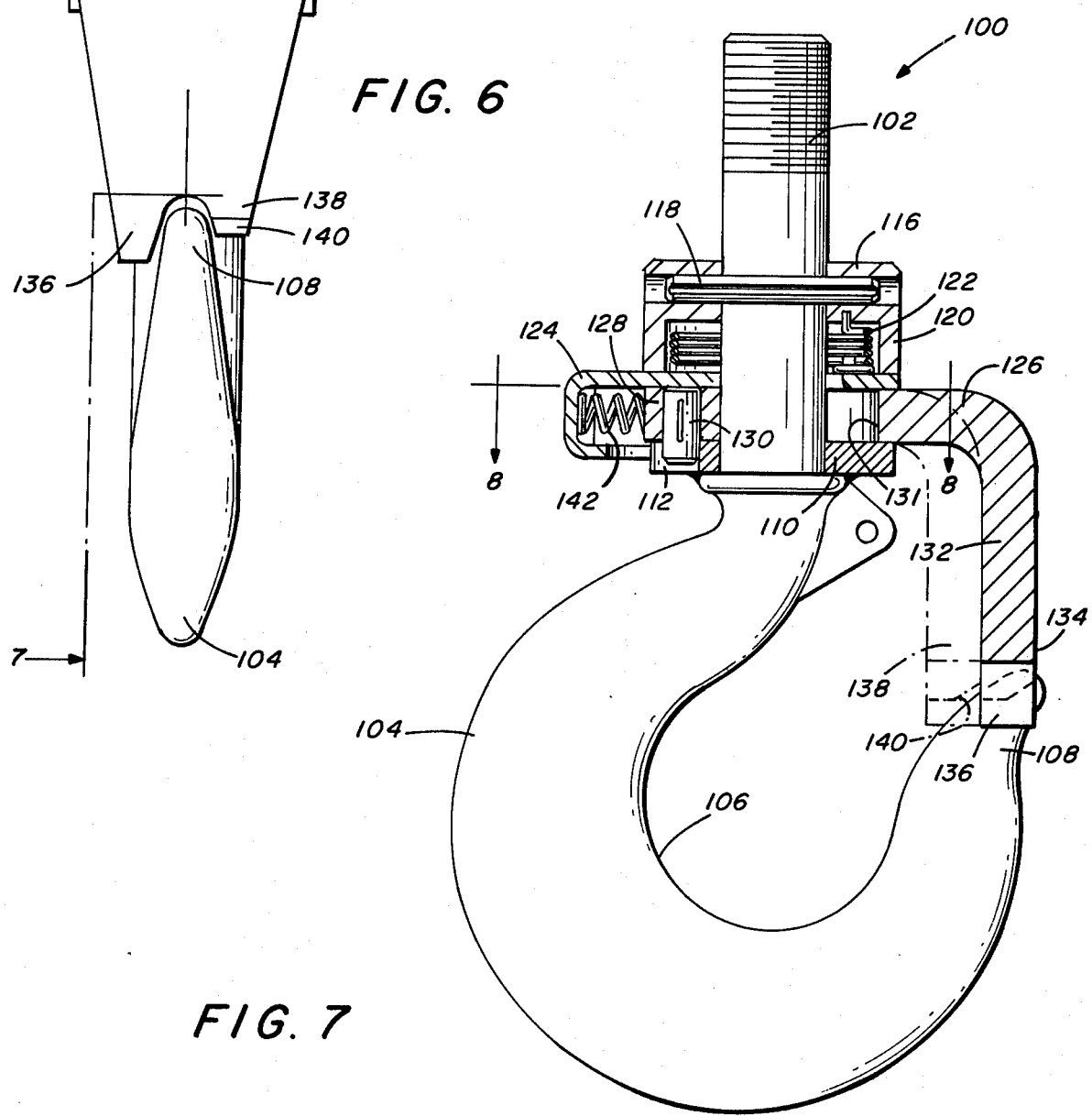
FIG. 7

SAFETY HOOK

BACKGROUND OF THE INVENTION

This invention relates generally to improved safety hooks. More particularly, but not by way of limitation, this invention relates to an improved safety hook including latch means that cannot be inadvertently opened.

Many attempts have been made to provide safety hooks that are effective in preventing the accidental removal of the loads from the hook. Typical of such prior hooks are the disclosures of U.S. Pat. No. 3,126,604 issued Mar. 31, 1964; U.S. Pat. No. 3,674,301 issued July 4, 1972; and U.S. Pat. No. 3,785,015 issued Jan. 15, 1974. In each of these hooks, some form of latch member has been provided that closes the hook opening in an effort to prevent the inadvertent disengagement of the load from the hook. While each of the foregoing does provide a hook with safety latch features, none includes the combined features available in the improved safety hook of this invention.

An object of this invention is to provide an improved safety hook.

A further object of this invention is to provide an improved safety hook that includes a latch mechanism that is easy to operate and, yet, one that positively prohibits the inadvertent disengagement of the load from the hook.

SUMMARY OF THE INVENTION

This invention provides an improved safety hook comprising a hook body that includes a shank having a cylindrical portion, a curved bill rigid with the shank defining a hook throat and a bill tip. A hollow spring retainer is pivotally located on the cylindrical portion of the shank. A generally L-shaped latch includes a first leg slidingly disposed in the retainer, and an elongated hole therein encompassing the cylindrical portion of the shank and includes a second leg depending from the first leg having a bifurcated end portion that straddles the bill tip. The bifurcated end portion has tines thereon of different lengths. Spring means is located in the retainer for biasing the latch toward a position wherein the tines on the end portion straddles the bill tip and locking means is provided that is cooperable between the cylindrical portion and the latch for preventing rotation of the latch spring retainer relative to the hook body until the bifurcated portion of the latch has been moved relatively away from the bill tip.

The foregoing and additional objects and advantages of the invention will become more apparent when the following detailed description is read in conjunction with the accompanying drawing.

BRIEF DESCRIPTION OF THE DRAWING

FIG. 6 is a front elevation view of another embodiment of safety hook that is also constructed in accordance with the invention.

FIG. 7 is a view, partially in cross section and partially in elevation, taken generally along the line 7—7 of FIG. 6.

FIG. 8 is a partial view of the hook of FIG. 6 taken generally along the line 8—8 of FIG. 7.

DESCRIPTION OF THE PREFERRED EMBODIMENT

Figure 1:
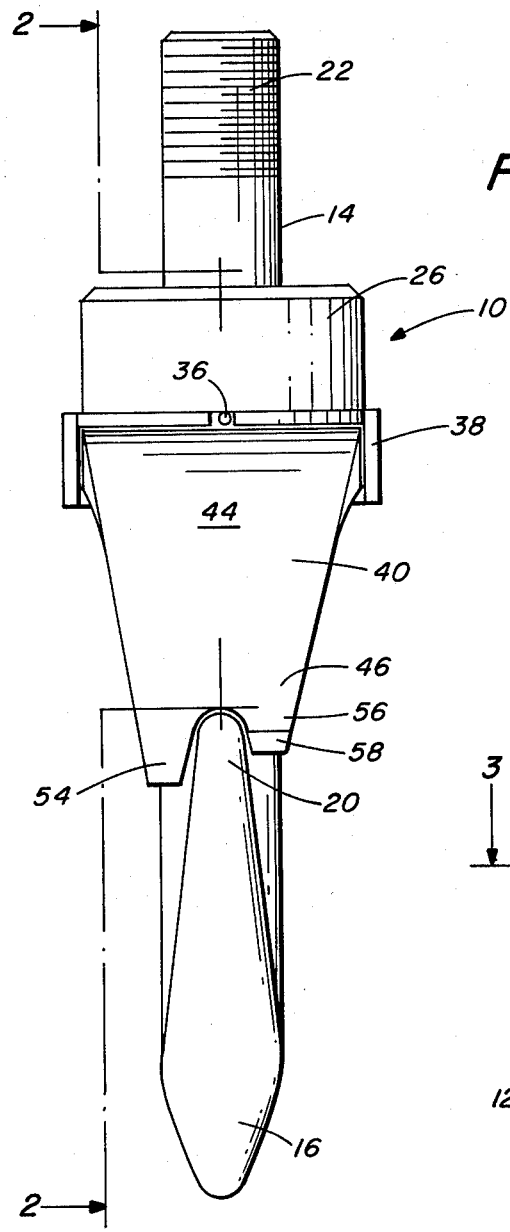
FIG. 1 is a front elevation view of a safety hook constructed in accordance with the invention.

Referring to the drawing and to FIGS. 1 through 4, in particular, shown therein and generally designated by the reference character 10, is an improved safety hook constructed in accordance with the invention. The hook 10 includes a hook body 12 having a generally cylindrical shank 14 and a curved bill 16 which defines a hook throat 18 and terminates in a bill tip 20.

The shank 14 is provided, at its upper end, with threads 22 or other suitable means for connecting the hook to hoisting apparatus. Near the juncture between the shank 14 and the hook body 12, the shank 14 is provided with a flat surface 24 formed in the shank 14 for purposes that will become more apparent hereinafter.

A torsion spring housing 26, which is generally cylindrical in configuration is secured to the shank 14 by a drive pin 28. The torsion spring housing 26 includes a depending cylindrical skirt 30 that encompasses a torsion spring 32.

The torsion spring 32 has a first end 34 connected to the torsion spring housing 26 and a second end 36 that is connected to a hollow spring retainer 38. The spring retainer 38 encircles the shank 14 and is rotatable relative thereto. An L-shaped latch member 40 includes a first leg 42 that is slidingly disposed within the spring retainer 38 and a second leg 44 that depends from the first leg 42 and terminates in a bifurcated end portion 46.

Figure 3:
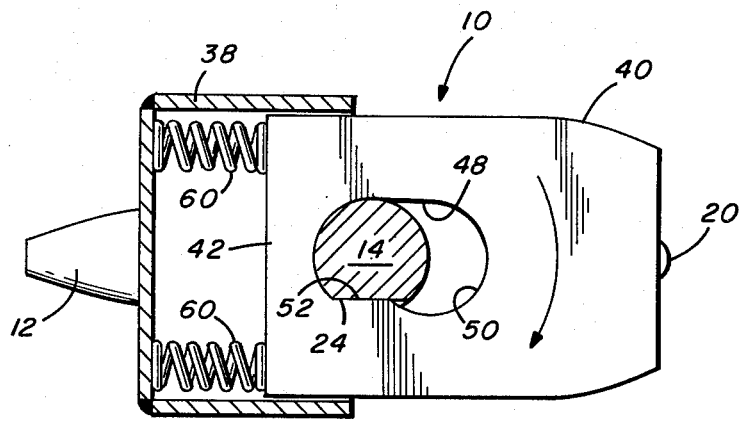
FIG. 3 is a view taken generally along the line 3—3 of FIG. 2.
Figure 4:
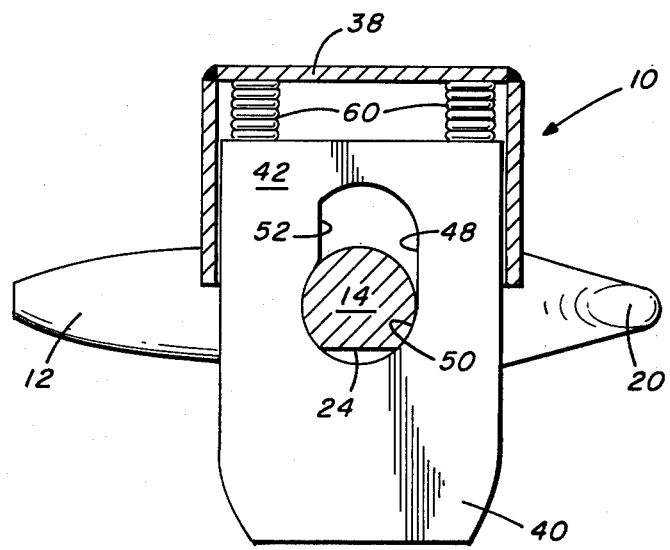
FIG. 4 is a view similar to FIG. 3, but illustrating the hook in another operating position.

As may be seen more clearly in FIG. 4, the first leg 42 encircles the shank 14 adjacent the flat surface 24 formed thereon. An opening or elongated hole 48 is formed in the first leg 42 to receive the shank 14. The hole 48 is somewhat elongated and provided with a cylindrical portion 50 that is slightly larger than the diameter of the shank 14 so that the latch member 40 can be rotated relative to the shank 14. In the elongated portion of the hole 48, the size of the hole has been reduced and provided with a flat side portion 52 that engages the flat surface 24 on the shank 14 when the latch member 40 is in the locked position as illustrated in FIGS. 2 and 3.

As previously mentioned, the depending leg 44 of the latch member 40 terminates in a bifurcated portion 46 providing tines 54 and 56 as shown most clearly in FIG. 1. The tine 54 is longer than the tine 56. The tine 56 is provided with a beveled portion 58 to provide rotational clearance between the latch member 40 and the bill tip 20 so that the latch member 40 can be rotated relative thereto as will be described.

Figure 2:
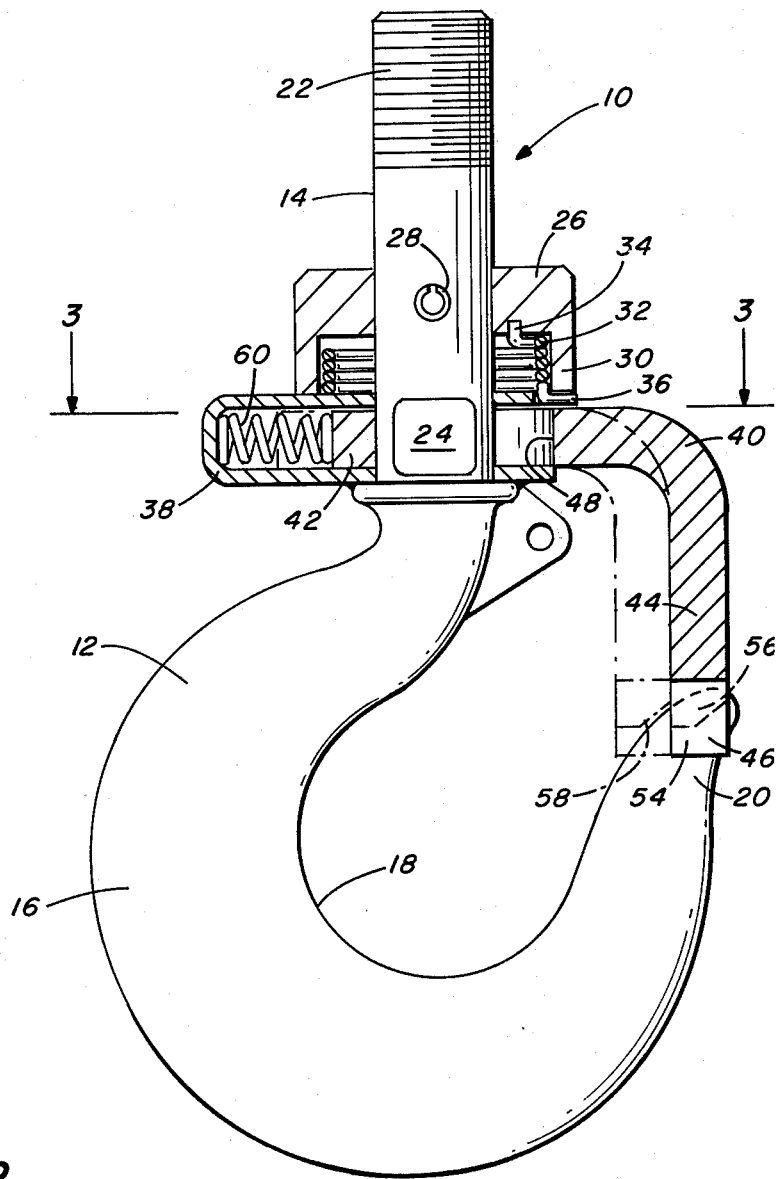
FIG. 2 is a view, partially in cross section and partially in elevation, taken generally along the line 2—2 of FIG. 1.

To maintain the latch member 40 in the latched position as illustrated in FIG. 2, a pair of spaced, generally parallel compression springs 60 are located within the hollow spring retainer 38. As may be seen more clearly in FIGS. 3 and 4, the compression springs 60 have one end in engagement with the end of the retainer 38 and the other end in engagement with the first leg 42 of the latch member 40 so that the latch member 40 is biased relatively outwardly of the retainer 38.

To apply a load to the hook 10, it is necessary to move the latch member 40 relatively away from the bill tip 20 to move the surface 52 in the latch member 40 parallel to the surface 24 on the shank 14. This movement compresses the springs 60 until the shank 14 is disposed in the cylindrical portion 50 of the hole 48 in the latch member 40. At this time, the latch member 40 is disposed in the dotted line position illustrated in FIG. 2.

It will be noted that the longer tine 54 still overlies the bill tip 20, but that the shorter tine 56, due to the bevel 58 thereon, is clear of the bill tip 20 to permit rotation of the latch member 40. In this position, the latch member 40 is rotated in a clockwise direction as illustrated by the arrow in FIG. 3 until it reaches the position illustrated in FIG. 4. When in the FIG. 4 position, the hook end is fully opened.

During the rotational movement of the latch member 40, the torsion spring 32 has been compressed so that it has been developed a force tending to return the latch member 40 to the position illustrated in FIG. 3, that is, toward the latched position. It will be noted further in FIG. 4 that the surface 52 in the latch member 40 and the surface 24 on the shank 14 are no longer in alignment and, thus, the latch member 40 cannot move relatively outwardly of the retainer 38. The arrangement of the surfaces 24 and 52 prohibit the outward movement of the latch member 40 and assures that as the latch member 40 returns toward the latched position, the bifurcated end 46 thereon cannot engage the bill tip 20.

Thus, and until the latch member 40 reaches the position wherein the surfaces 24 and 54 are in alignment, no interference will occur prohibiting the latch member 40 from returning to the fully closed or latched position. Upon returning to the position wherein the surfaces 24 and 54 are aligned, the compression springs 60 urge the latch member 40 outwardly of the housing 38 returning the latch member 40 to the position wherein the tines 54 and 58 straddle the bill tip 20.

It should be pointed out that once the hook 10 has been latched an inadvertent force on the latch member 40 in any direction will not displace the latch 40 from the locked position. The latch member 40 cannot rotate since the tines 54 and 56 engage the bill tip 20 and the surfaces 24 and 54 are in engagement. An inwardly directed force on the latch member 40 cannot move the latch member 40 a sufficient distance to permit the load to become disengaged from the hook since the latch member 40 will move only to the dotted line position illustrated in FIG. 2. An upwardly directed force cannot displace the latch member 40 from its locked position.

From the foregoing, it will be apparent that the safety hook 10, while it can be quickly and easily operated by simply pressing in on the latch member 40 and rotating it in a clockwise direction, cannot become inadvertently disengaged from the load.

Figure 5:
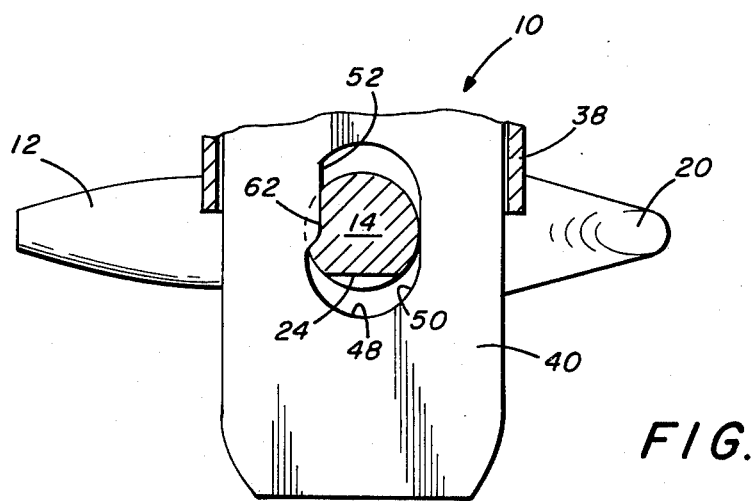
FIG. 5 is a partial view similar to FIG. 3, but illustrating a modification of the safety hook that is also construed in accordance with the invention.

Modification of FIG. 5

The modification of the hook 10 illustrated in FIG. 5 is of a such simple nature that the same reference characters will be utilized thereon as previously utilized in the description of FIGS. 1 through 4. In some instances, it is desirable to be able to latch the hook in the fully open position, that is, in a position wherein the hook when in the open position must be overtly actuated to return to closed position.

In the modification of the hook shown in FIG. 5, a flat surface 62 has been formed on the shank 14 at an angle of approximately 90° relative to the flat surface 24 previously described. The surface 62 extends into the shank 14 approximately the same distance as did the flat surface 24. Other than this modification, the modified hook 10 of FIG. 5 is constructed identically to that previously described in connection with the hook of FIGS. 1 through 4.

Also, the operation is identical to that of the hook 10 described in FIGS. 1 through 4 with the following exception. When the latch member 40 is rotated to the fully opened position, the compression springs 60 move the latch member relatively outwardly since the surface 52 in the latch member 40 is aligned with the flat surface 62 in the shank 14. The slight outward movement of the latch member 40 brings the surfaces 52 and 62 into engagement so that the latch member 40 is prevented from rotating to the position illustrated in FIG. 3. To return the latch member 40 to the closed position, it is necessary to move the latch member 40 against the force exerted by the springs 60 until the surfaces 52 and 62 are disengaged. Upon disengagement of the surfaces 52 and 62, that is, when the shank 14 has returned to the cylindrical portion 50 of the hole 48, the torsion spring 32 rotates the latch member 40 in the counterclockwise direction returning the latch member 40 into alignment with the bill tip 20. When the tines 56 and 54 on the latch member 40 are in alignment with the bill tip 20, the compression springs 60 move the latch member 40 outwardly bringing the surface 52 on the latch member 40 into engagement with the surface 24 on the shank 14 and relatching the hook 10.

Description of the Embodiment of FIGS. 6–8

FIGS. 6, 7 and 8 illustrate another embodiment of safety hook that is generally indicated by the reference character 100 that is also constructed in accordance with the invention. The safety hook 100 includes a shank 102 and a hook body 104 which is curved to form a hook throat 106 and terminates in a bill tip 108.

A latch disk 110 encircles the shank 102 and is illustrated as being welded to the body 104. Manifestly, the latch disk 110 could be formed as an integral portion of the hook body 104 if desired. The latch disk 110 includes a slot 112 extending through the edge thereof opposite the side of the hook 100 containing the bill tip 108. As may be seen in FIG. 8, a latch notch or recess 114 is formed in the periphery of the latch disk 110 and is disposed at approximately 90° from the slot 112.

A hollow torsion spring retainer 116 is connected to the shank 102 by a drive pin 118. The torsion spring retainer has a depending skirt portion 120 that is sized to receive a torsion spring 122. One end of the torsion spring 122 is connected to the torsion spring housing 116 and the opposite end thereof is connected to a hollow compression spring housing 124. The compression spring housing 124 is rotatable relative to the shank 102 and the torsion spring housing 116 for reasons that will become more apparent hereinafter.

An L-shaped latch member 126 has a first leg 128 disposed within and slidable with respect to the compression spring housing 124. However, it will be noted that the latch member 126 and compression spring housing 124 rotate as a unit. An elongated hole 131 having a width approximately the same as the shank 102 is formed in the leg 128 to permit the latch member 126 to rotate and slide relative to the shank 102. A latch pin 130 is mounted in the leg 120 of the latch member 126 and projects downwardly into the slot 112 in the latch disk 110.

A second or depending leg 132 of the latch member 126 has a bifurcated end portion 134 that straddles the bill tip 108. The bifurcated end portion 134 includes a first tine 136 and a second and shorter tine 138. The shorter tine 138 includes a beveled portion 140.

Disposed within the compression spring housing 124 are a pair of spaced compression springs 142. The compression springs 142 have one end in engagement with the spring housing 124 and their opposite ends in engagement with the leg 128 of the latch member 126 so that they provide a force tending to bias the latch member 126 toward the position illustrated in FIGS. 6 and 7.

To open the hook 100 to receive a load, the latch member 126 is pressed toward the left as seen in FIG. 7, compressing the springs 142 and moving the pin 130 out of the slot 112 in the latch disk 110. In this position, the latch member 126 occupies the dotted-line position shown in that Figure. It will be noted that the beveled portion 140 just clears the bill tip 108 to permit rotation of the latch member 126 in the clockwise direction as viewed in FIG. 8.

When the pin 130 has cleared the slot 112, the latch member 126 is rotated in a clockwise direction so that the pin 130 rides on the outer periphery of the latch disk 110. During this time, the torsion spring 122 is being energized so that upon release of the latch member 126, the latch member will be rotated in a counterclockwise direction. Upon realignment of the pin 130 with the slot 112, the compression springs 142 return the latch member 126 to the position wherein the tines 136 and 138 straddle the bill tip 108.

The recess 114 has been previously mentioned as being formed in the outer periphery of the latch disk 110. The recess 114 is an optional feature that provides a means of latching the latch member 126 in a rotated or open position when desired. If it is desired to latch the latch member 126 in the rotated position, the latch member 126 is simply rotated until the pin 130 aligns with the recess 114 at which time the compression springs 142 move the latch member 126 slightly outwardly bringing the pin into the recess 114. Rotation of the latch member 126 by force exerted by the torsion spring 122 is prevented until such time as the pin 130 is manually moved out of the recess 114.

As previously mentioned in connection with the safety hook 10, the safety hook 100 also provides the important features of having a locking mechanism to prevent inadvertent rotation of the latch member 126 out of the closed position. As can be appreciated from the foregoing, not only does the bifurcated leg 134 of the latch member straddle bill tip 108 to prevent rotation, but also the pin 130 is disposed in the slot 112 for additional protection against any inadvertent rotation of the latch member 126.

Inadvertent movement inwardly of the latch member 126 will not permit the load to become disengaged from the hook since the tines 136 and 140 extend downwardly a sufficient distance so that the load cannot slip between the latch member and the bill tip 108. Thus, to remove the load intentionally, it is necessary to depress the latch member 126 and then manually rotate it to a position opening the hook. It is highly unlikely that such movement to unlatch the hook could occur by accident.

The foregoing detailed description is presented by way of example only and it will be understood that many changes and modifications can be made thereto without departing from the spirit and scope of the invention.

The embodiments of the invention in which an exclusive property or privilege is claimed are defined as follows:

1. An improved safety hook comprising in combination:
   a hook body including a shank having a cylindrical portion, a curved bill rigid with said shank defining a hook throat, and a bill tip;
   a hollow spring retainer pivotally located on the cylindrical portion of said shank;
   a generally L-shaped latch including a first leg slidably disposed in said retainer and having an elongated hole therein encompassing said cylindrical portion and including a second leg depending from said first leg and having a bifurcated end portion engageable with said bill tip, said bifurcated end portion having tines thereon of different lengths;
   spring means in said retainer for biasing said latch toward a position wherein the tines on said end portion straddles said bill tip; and,
   locking means cooperable between said cylindrical portion and latch for preventing rotation of said latch and spring retainer relative to said hook body until the bifurcated end portion of said latch has been moved relatively away from said bill tip.

2. The safety hook of claim 1 wherein said locking means includes:
   a flat surface on one side of said cylindrical portion; and
   a portion of the hole in said latch of reduced size and configured to closely receive and engage the flat surface on said cylindrical portion to prevent rotation of said latch about said shank.

3. The safety hook of claim 2 wherein said locking means also includes a second flat surface on said cylindrical portion angularly offset from said first mentioned flat surface, said second flat surface engaging said latch in said reduced portion retaining said latch in an angularly disposed position relative to said tip when said latch has been rotated into said angular position.

4. The safety hook of claim 1 wherein said locking means includes:
   a key member carried by said latch and disposed parallel to said cylindrical portion; and,
   a latch disk mounted on said shank and having a slot extending through the periphery thereof sized to receive said key member to prevent rotation of said latch about said shank.

5. The safety hook of claim 4 wherein said latch disk has a recess in its outer periphery that is angularly spaced from said slot and sized to receive said key member.

6. The safety hook of claim 1 wherein said spring means includes a torsion spring encircling said shank, said torsion spring having a first end operably connected with said shank and a second end engaging said retainer to urge said latch and retainer in rotational movement toward a position wherein said tines are aligned to straddle said bill tip.

7. The safety hook of claim 6, and also including a hollow torsion spring housing connected to said shank and sized to encompass said torsion spring and having a skirt portion terminating adjacent said retainer, said first end of said torsion spring being connected to said housing.

8. The safety hook of claim 1 wherein said spring means includes a compression spring located in said retainer and having a first end engaging said retainer and a second end engaging the free end of said first leg to urge the second leg of said latch relatively away from said shank.

9. The safety hook of claim 8, wherein said spring means also includes a torsion spring encircling said shank, said torsion spring having a first end operably connected with said shank and a second end engaging said retainer to urge said latch and retainer in rotational movement toward a position wherein said tines are aligned to straddle said bill tip.

10. The safety hook of claim 9, and also including a second compression spring in said retainer, said compression springs being located in generally parallel relationship and in concert urging the second leg of said latch relatively away from said shank.

11. The safety hook of claim 10 wherein one of said tines is sufficiently long to engage said bill tip preventing rotation of said latch in one direction and the other of said tines is of comparatively reduced length permitting rotation of said latch in the other direction and said tines and torsion spring being arranged to cause compression in said torsion spring in the permitted rotational direction.

* * * * *